(12) United States Patent
Fontanet et al.

(10) Patent No.: US 9,228,823 B2
(45) Date of Patent: Jan. 5, 2016

(54) INDUCTIVE POSITION SENSOR

(71) Applicants: CONTINENTAL AUTOMOTIVE FRANCE, Toulouse (FR);
CONTINENTAL AUTOMOTIVE GmbH, Hannover (DE)

(72) Inventors: Alain Fontanet, Muret (FR);
Jean-Louis Roux, Brax (FR); Olivier Gerardiere, Tournefeuille (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 36 days.

(21) Appl. No.: 14/173,014

(22) Filed: Feb. 5, 2014

(65) Prior Publication Data

US 2014/0225600 A1    Aug. 14, 2014

(30) Foreign Application Priority Data

Feb. 12, 2013 (FR) ...................................... 13 51181

(51) Int. Cl.
G01B 7/14 (2006.01)
G01B 7/30 (2006.01)
H01F 17/00 (2006.01)
G01D 5/20 (2006.01)

(52) U.S. Cl.
CPC ................ G01B 7/30 (2013.01); G01D 5/2053 (2013.01); H01F 17/0013 (2013.01)

(58) Field of Classification Search
CPC .... G01B 7/30; G01D 5/2053; H01F 17/0013; H01F 2027/2809
See application file for complete search history.

(56) References Cited

U.S. PATENT DOCUMENTS

| 5,543,773 | A | * | 8/1996 | Evans | ................ H01F 27/2804 336/183 |
| 5,804,963 | A | | 9/1998 | Meyer | |
| 6,011,389 | A | * | 1/2000 | Masreliez et al. | ....... 324/207.17 |
| 6,124,708 | A | * | 9/2000 | Dames | ..................... 324/207.12 |
| 6,236,199 | B1 | * | 5/2001 | Irle et al. | .................. 324/207.17 |
| 6,522,128 | B1 | | 2/2003 | Ely et al. | |

(Continued)

FOREIGN PATENT DOCUMENTS

| EP | 0 785 415 | 7/1997 |
| EP | 1 396 929 | 3/2004 |

OTHER PUBLICATIONS

French Search Report dated Oct. 8, 2013, corresponding to the Foreign Priority Application No. 1351181.

*Primary Examiner* — Huy Q Phan
*Assistant Examiner* — Dustin Dickinson
(74) *Attorney, Agent, or Firm* — Young & Thompson

(57) ABSTRACT

This inductive position sensor includes: a primary winding, and at least two secondary windings (4, 6) each constituted by several turns (8) produced on two layers of a printed circuit board. A secondary winding has turns (8) each having substantially the same shape, aligned in a direction referred to as longitudinal, each time with an offset between them. The turns (8) each have a first globally concave part (12) disposed on one layer of the printed circuit board and a second globally concave part (14) disposed on the other layer of the printed circuit board, the first part of a turn is connected to the second part of the same turn by a first via (36a) passing through the printed circuit board, the first part of a turn is connected to the second part of an adjacent turn by a second via (36b) passing through the printed circuit board.

14 Claims, 6 Drawing Sheets

(56) References Cited

U.S. PATENT DOCUMENTS 6,972,658 B1 * 12/2005 Findley ............... H01F 17/0006
                                                                257/531
2002/0089326 A1 * 7/2002 Morrison et al. ........ 324/207.12
2006/0076949 A1 * 4/2006 Kawatoko ................ 324/207.17
2014/0104288 A1 * 4/2014 Shenoy .................... G09G 5/00
                                                                345/531

* cited by examiner

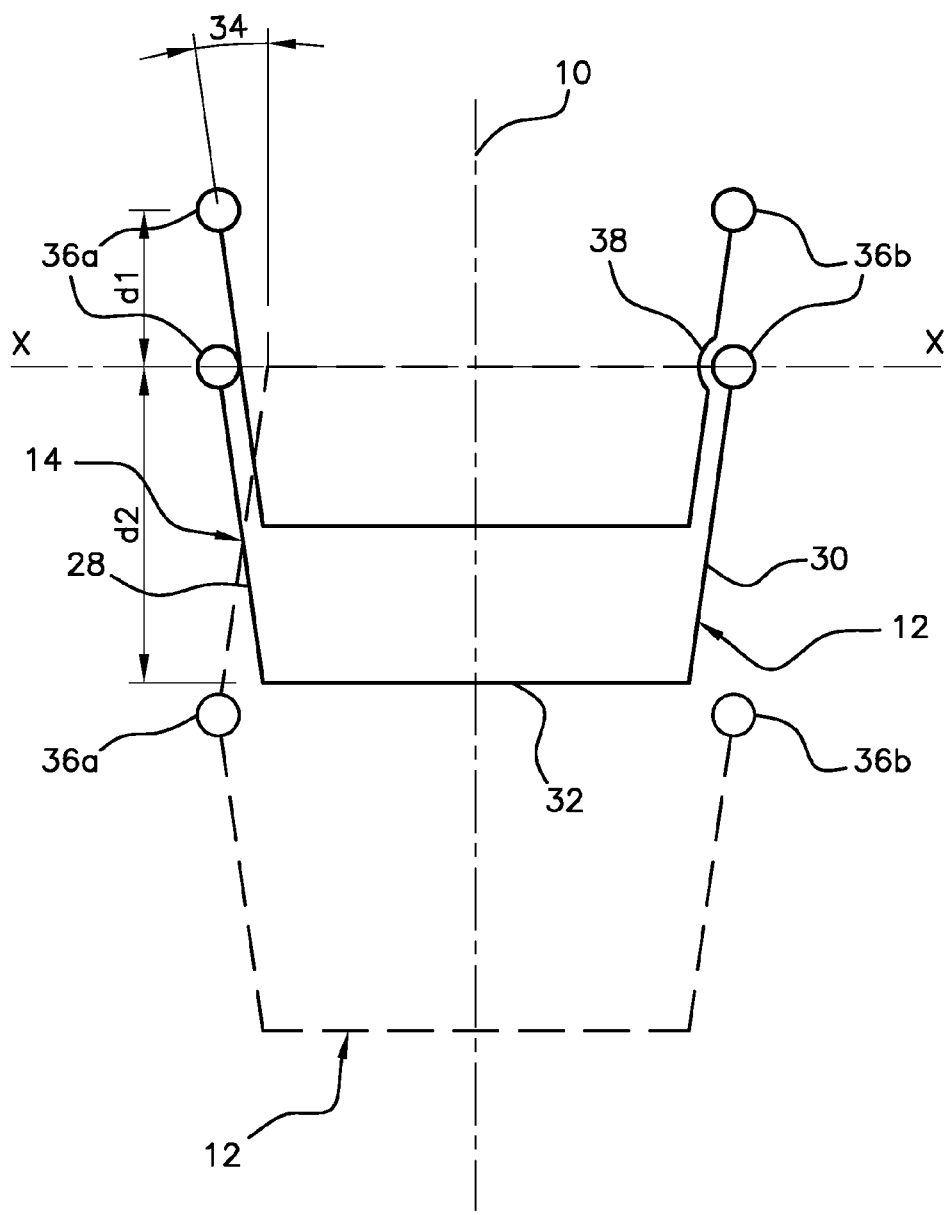

INDUCTIVE POSITION SENSOR

FIELD OF THE INVENTION

The present invention relates to an inductive position sensor.

This type of sensor has the advantage of making it possible to determine the position of a mechanical part, or of any other element, without necessitating contact with the part whose position is wished to be known. This advantage means that the applications of such sensors are very numerous in all types of industries. Such sensors are also used in mass consumption applications such as for example in the motor vehicle field within which the present invention has been embodied. However, it can be used in other diverse and varied fields.

BACKGROUND OF THE INVENTION

The operating principle of an inductive sensor is based on the variation of coupling between a primary winding and secondary windings of a transformer operating at high frequency and without using a magnetic circuit. The coupling between these windings varies according to the position of a moving (electrically) conductive part, generally called the "target". Currents induced in the target in fact modify the currents induced in the secondary windings. By adapting the configuration of the windings and knowing the current injected in the primary winding, measuring the current induced in the secondary windings makes it possible to determine the position of the target.

In order to integrate such an inductive sensor in a device, notably an electronic device, it is known to produce the transformer mentioned above on a printed circuit board. The primary winding and the secondary windings are then constituted by tracks formed on the printed circuit board. The primary winding is then for example supplied by an external source and the secondary windings then carry currents induced by the magnetic field created by a current flowing in the primary winding. The target, which is a conductive part, for example made of metal, can have a simple shape. It can for example be a part cut out from sheet metal. In order to produce a linear sensor, the cutting for producing the target is for example rectangular whereas, for a rotary sensor, this cutting will be for example in the shape of an angular sector, the radius and angle of which are adapted to the movement of the part.

Generally, two sets of secondary windings are designed to produce sine and cosine functions of the position of the target over a complete travel of the sensor. Such functions (cos and sin) are well known and can be processed easily by an electronic system. By forming the ratio of the sine to the cosine and then by applying an arctangent function, an image of the position of the target is obtained. The argument of the sine and cosine functions is a linear (or affine) function of the position of the target whose travel then represents a greater or lesser portion of the spatial period of these trigonometric functions.

In order to obtain measurable induced currents reliably, it is preferable to have either a large number of turns or turns of large size. The second option is not compatible with the production of a compact sensor. Because of this, it is generally chosen to have a large number of turns.

In order to limit the space occupied on the printed circuit board, the present invention proposes producing turns to form the secondary windings on two separate layers.

In order to do this, it is appropriate to produce vias passing through the printed circuit board to allow the connection of the turns thus produced.

A purpose of the present invention is to propose an arrangement of turns for producing secondary windings of an inductive position sensor which is easy to implement.

Another purpose of the invention is to propose an arrangement making it possible to limit, for a given number of turns, the number of vias to be produced in the corresponding printed circuit board.

Advantageously, the turns will be able to be arranged in a compact manner in order to limit the overall dimensions of the sensor.

In order to facilitate the use of measurements made at the level of the secondary windings, the proposed arrangement will preferably make it possible to have a substantially constant distance between the different turns of the secondary windings and the primary winding.

SUMMARY OF THE INVENTION

To that end, the present invention proposes an inductive position sensor comprising, on the one hand, a primary winding and, on the other hand, at least two secondary windings each constituted by several turns produced on two layers of a printed circuit board.

According to the present invention:
- a secondary winding has turns each having substantially the same shape;
- said turns are aligned along a direction referred to as longitudinal, each time with an offset along the longitudinal direction;
- each of said turns has a first globally concave part disposed on one layer of the printed circuit board and a second globally concave part disposed on the other layer of the printed circuit board;
- the first part of a turn is connected to the second part of the same turn by a first via passing through the printed circuit board;
- the first part of a turn is connected to the second part of an adjacent turn by a second via passing through the printed circuit;
- the first part of a turn has a first edge extending from the first via, a second edge extending from the second via and a bottom connecting the first and second edges;
- the first edge and the second edge converge as they become more distant from the corresponding first and second vias;
- the offset in the longitudinal direction between two adjacent turns is less than the distance separating the bottom of a first part of a turn and an axis passing through the corresponding first and second vias.

Such a sensor having at least one secondary winding, and preferably all of its secondary windings, as proposed above is easy to implement firstly because it makes it possible to limit the number of vias to be produced on the printed circuit board. The alignment mentioned here is not necessarily linear. It can also be an arc of circle or possibly an arc of ellipse. Those skilled in the art will have understood that this alignment corresponds to the direction of movement of the object whose position is desired to be known. It is most often a linear movement (therefore the case of a linear position sensor) but it can also be a movement along a curved path, most often a circular one.

In a preferred embodiment, the position sensor according to the invention is such that the turns of a same secondary winding are connected to each other in such a way that the electromotive forces induced in these turns by an alternating magnetic field are added together. This further facilitates the production of the turns.

In order to facilitate the use of the voltage measurements made at the terminals of the secondary windings, provision is advantageously made for the longitudinal offset between two turns to be constant.

One embodiment provides for each first part of a turn and for each second part of a turn to have substantially the shape of a half-hexagon. The turns are thus produced by forming linear portions and the number of linear portions is limited without penalizing the area of the turn too much.

In order to make it easier for the turns of the secondary windings to all be the same distance from the primary winding, provision is made for example for a first set constituted by first vias and a second set constituted by second vias to be aligned on two segments parallel with the longitudinal direction. In this configuration, in order to have in fact the same distance between the primary winding and the turns of secondary windings, the primary winding surrounds the secondary windings and advantageously has turns comprising linear portions extending longitudinally.

A position sensor according to the present invention can comprise two nominal secondary windings and two redundant secondary windings, and in this case it is advantageously possible to provide for the redundant secondary windings to have a shape substantially similar to that of the nominal secondary windings.

It is thus useless to multiply the number of vias. The cost price of such a sensor is hardly higher than that of a sensor having only nominal windings.

A sensor according to the invention can comprise two sets of secondary windings, one for carrying out a sine function and the other for carrying out a cosine function. One of these sets of secondary windings comprises for example two secondary windings disposed symmetrically with respect to a median axis and connected in such a way that the electromotive forces induced in the turns of a first secondary winding oppose the electromotive forces induced in the turns of the second secondary winding.

In one embodiment of the present invention, it is possible to provide for the first edge of a first part of a turn to be substantially straight and to form an angle of between 18° and 45° with the longitudinal axis.

BRIEF DESCRIPTION OF THE DRAWINGS

Details and advantages of the present invention will become more apparent in the following description, given with reference to the appended diagrammatic drawing in which:

FIG. 10 is a diagrammatic illustration of a variant shape of a turn of a sensor according to the present invention.

DETAILED DESCRIPTION OF THE INVENTION

Figure 7:
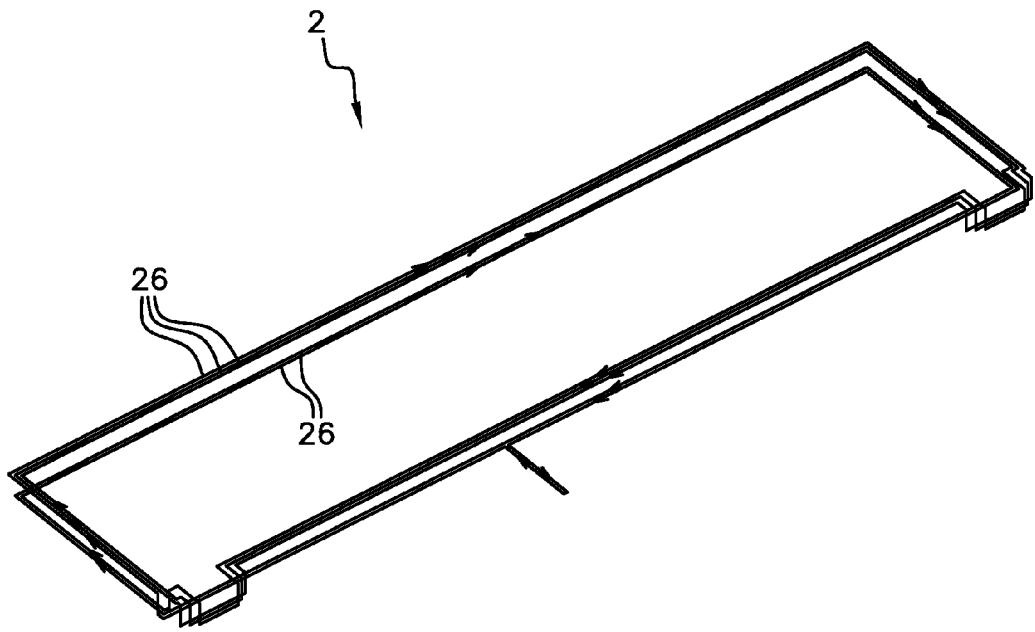
FIG. 7 is a perspective view of a primary winding (or transmitter) intended to cooperate with the secondary windings shown in the preceding figures.
Figure 7:
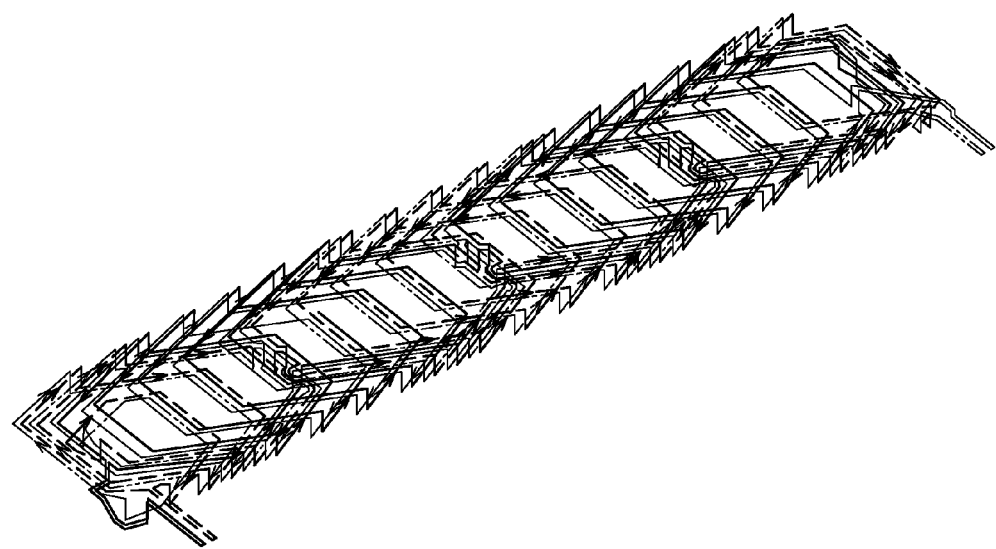
Figure 8:
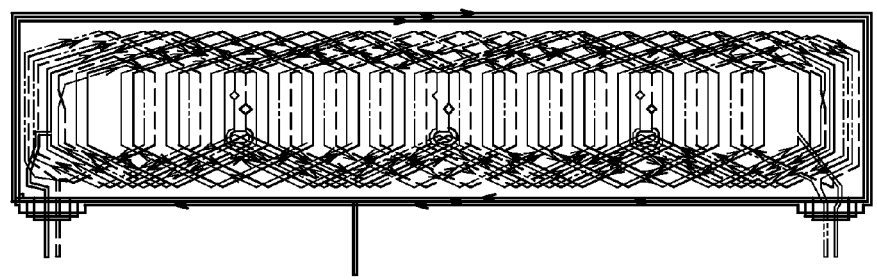
FIG. 8 is a plan view of a position sensor integrating the primary winding shown in FIG. 7 and the secondary windings shown in FIGS. 5 and 6.
Figure 9:
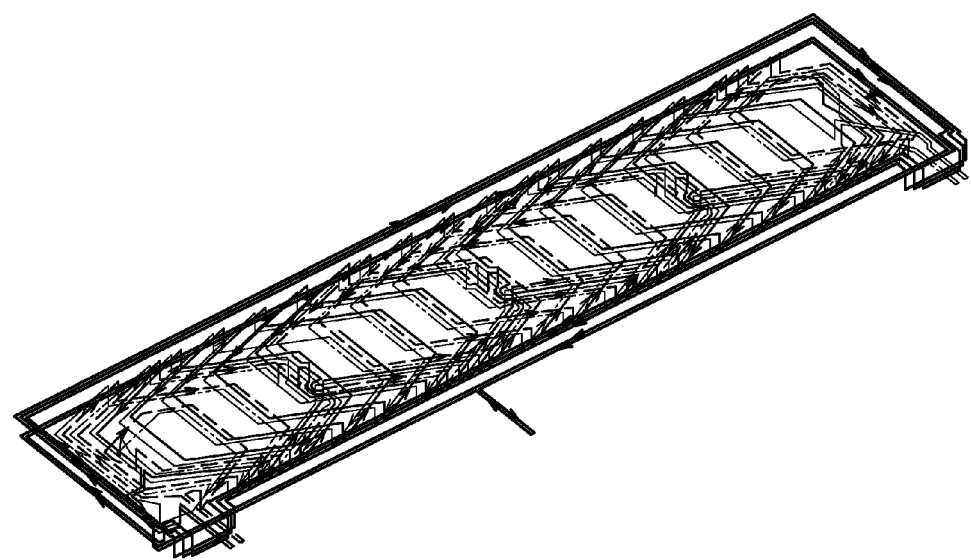
FIG. 9 is a plan view of the position sensor shown in FIG. 8.

FIGS. 8 and 9 show an inductive position sensor according to the present invention. This sensor comprises a primary winding 2 shown alone in FIG. 7 and secondary windings shown in FIGS. 1 to 6. These windings are produced by forming conductive tracks on a printed circuit board and are described in detail below.

The position sensor shown here is identical to that of a transformer with a transmitting primary winding and receiving secondary windings. This transformer does not comprise a magnetic core. Equations making it possible to understand the functioning of this sensor are written below. In these equations, the index 1 is used for variables corresponding to the primary winding whilst the index 2 is used for variables corresponding to the secondary windings.

It is assumed that an alternating voltage U1 is applied to the two terminals of the primary winding. Because of this, an alternating current i1 is produced in the track of a primary circuit corresponding to this primary winding. This current produces magnetic induction and generates a magnetic flux $\phi_1$ that is variable over time.

These different physical variables are related by the following equations:

$$U_1 = r_1 i_1 + \frac{d\varphi_1}{dt}$$

where r1 is the resistance of the primary circuit.

$$\phi_1 = L_1 i_1$$

where L1 is the inductance of the transmitting primary winding.

The derivative with respect to time of this second equation, assuming a sinusoidal voltage, gives the following equation:

$$\frac{d\varphi_1}{dt} = j\omega\varphi_1$$

where $\omega$ represents the pulsatance related to the frequency of the sinusoidal voltage ($\omega=2\pi f$) and j is the complex number such that $j^2=-1$.

By way of non-limiting example, a relatively high frequency will be chosen, for example of the order of a megahertz, such as 3.5 MHz which is already used for such applications.

The following is derived from the preceding equations:

$$U_1 = r_1 i_1 + j\omega L_1 i_1$$

The voltage U2 at the terminals of the receiving secondary windings is produced by the variation of the magnetic flux $\phi_2$ coming from the primary winding and passing through these secondary windings.

$$U_2 = \frac{d\varphi_2}{dt}$$

The currents induced in the secondary windings will be considered here as being negligible because it is estimated that the input impedances of the electronic components connected to the secondary windings are virtually infinite. Because of this, there is also the following equation:

$$U_2 = j\omega M_{12} i_1$$

where $M_{12}$ is a coupling coefficient between the primary winding and the secondary winding in question.

Let $N_1$ and $N_2$ be the number of turns of the primary winding and of the secondary winding in question respectively.

$L_1 = N_1^2 l$; where $l$ is called the reduced inductance
$M_{12} = N_1 N_2$; where $m$ is called the reduced mutual The coupling factor corresponding to the ratio of the induced voltage with respect to the primary voltage is given by the formula:

$$\frac{U_2}{U_1} = \frac{j\omega M_{12} i_1}{ri_1 + j\omega L_1 i_1} = \frac{\omega^2 L_1 M_{12} + j\omega r_1 M_{12}}{r^2 + L^2 \omega^2}$$

There is therefore a primary/secondary phase shift angle $\delta$ defined by:

$$\tan\delta = \frac{r}{L\omega}$$

By making the reasonable assumption that the resistive part of the primary winding is negligible, the following is then obtained:

$$\frac{U_2}{U_1} = \frac{N_2 m}{N_1 l}$$

This equation shows that the coupling factor depends on the ratio $m/l$ which depends only on the shape of the turns of the windings and on the position of a conductive target. This equation also shows how the coupling factor can be modified. For example, by reducing the number of turns of the primary winding, it is possible to raise the value of the coupling factor.

Figure 1:
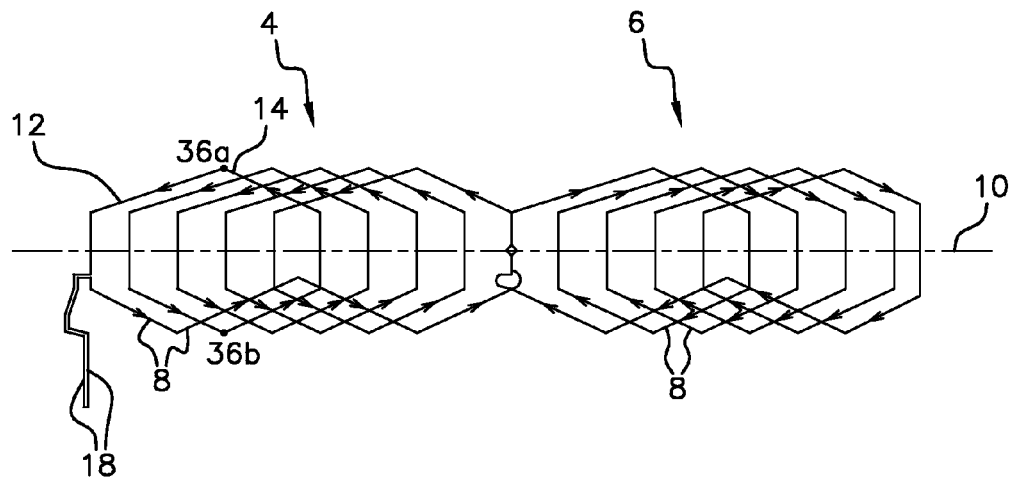
FIG. 1 is a plan view of two secondary windings of a position sensor according to the present invention.

FIG. 1 shows a plan view of a first secondary winding 4 and a second secondary winding 6. Each of these two windings has turns 8. It is observed that, for each of these windings, the turns 8 are all substantially similar but that each one is offset with respect to the other in a longitudinal direction illustrated in FIG. 1 by a longitudinal axis 10.

In a preferred embodiment, the longitudinal offset between two adjacent turns is always the same. Moreover, still in a preferred way, the second secondary winding 6 is, in plan view, symmetrical with the first secondary winding 4 with respect to a transverse plane (not shown) orthogonal to the longitudinal axis 10. The number of turns of the two windings is the same and the area of the turns is also the same.

Each turn 8 has a first upper part 12 and a second lower part 14, the first upper part 12 corresponding to a track etched on a layer of the printed circuit board (not shown) and the second lower part 14 corresponding to a track etched on another layer of the same printed circuit board. Electrical continuity between said tracks forming the first upper part 12 and the second lower part 14 is provided by a first via 36a (cf. FIG. 10) passing through the printed circuit board and within which a section 16 provides said electrical continuity.

The electrical continuity between two adjacent turns is provided as follows: the first part 12 of a turn is connected to the second part of an adjacent turn by a second via 36b (cf. FIG. 10) passing through the printed circuit board within which a section 16 provides said electrical continuity. Each first upper part 12 and each second lower part 14 exhibit, in the embodiment shown in the drawing, the shape of an (irregular) hexagon. Each first upper part 12 and each second lower part 14 thus each have a globally concave shape, the concavity of the first upper part 12 of a turn 8 being oriented in the opposite direction to that of the concavity of the second lower part 14 of the same turn. More generally, in a secondary winding, the upper parts 12 exhibit a concavity oriented one way and the lower parts 14 exhibit a concavity oriented the way opposite to that of the first way. It could thus be possible to have lower and/or upper parts in the shape of an arc of circle, an arch of ellipse, a half-octagon, etc. In plan view, a certain symmetry is observed between a first upper part 12 and the corresponding second lower part 14 with respect to a straight line passing through the first and second vias (36a, 36b). The symmetry is not perfect because of the offset existing between the turns.

The sections 16, whose positions also correspond to those of the first and second vias (36a, 36b) to which they are connected, are aligned on two parallel segments disposed on either side of the longitudinal axis 10 and perpendicular to the latter, that is to say passing through the printed circuit. These two segments are not disposed symmetrically with respect to the longitudinal axis 10 but are offset in the longitudinal direction defined by the longitudinal axis.

The first secondary winding 4 and the second secondary winding 6 are connected at the level of the transverse plane of symmetry such that for a given variable magnetic flux, the electromotive forces induced in the first secondary winding 4 oppose the electromotive forces induced in the second secondary winding 6. Within a same winding, it is observed that the electromotive forces induced by a variable magnetic flux in each of the turns 8 are added together.

Figure 2:
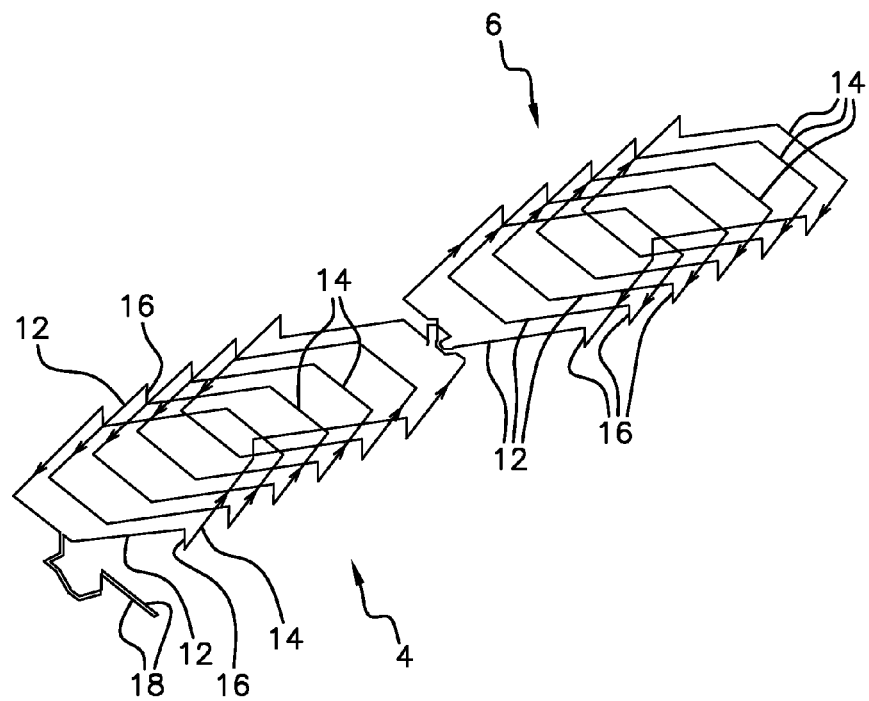
FIG. 2 is a perspective view of the secondary windings shown in FIG. 1.

Finally, the presence of two connection tracks 18 making it possible to connect the secondary windings to a device for measuring the voltage appearing at the terminals of these windings can be seen on the left hand side of FIGS. 1 and 2.

The set formed by the first secondary winding 4 and the second secondary winding 6 make it possible for example to produce a sine function when a conductive target moves in the proximity of these windings. In order to produce a cosine function, it is known to use another set of windings that is superimposed on the first set of windings.

Figure 3:
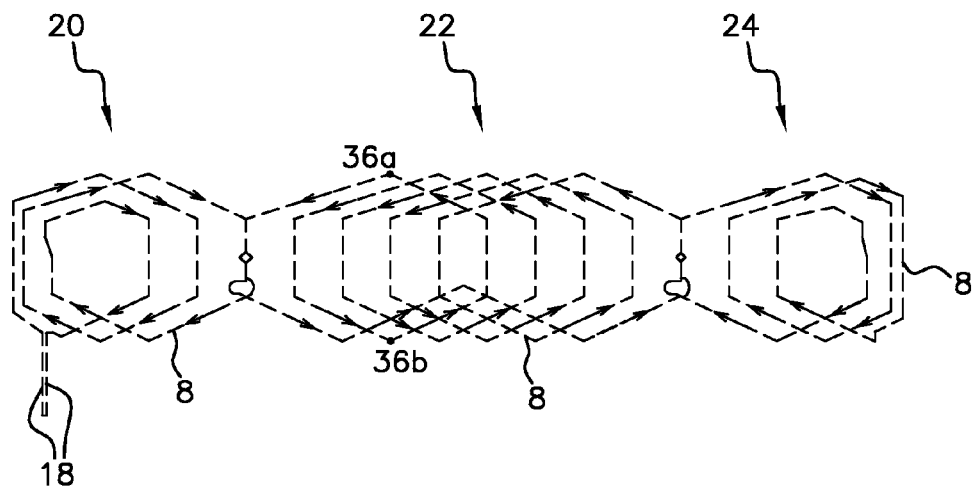
FIG. 3 is a plan view of three secondary windings of a position sensor according to the present invention.
Figure 4:
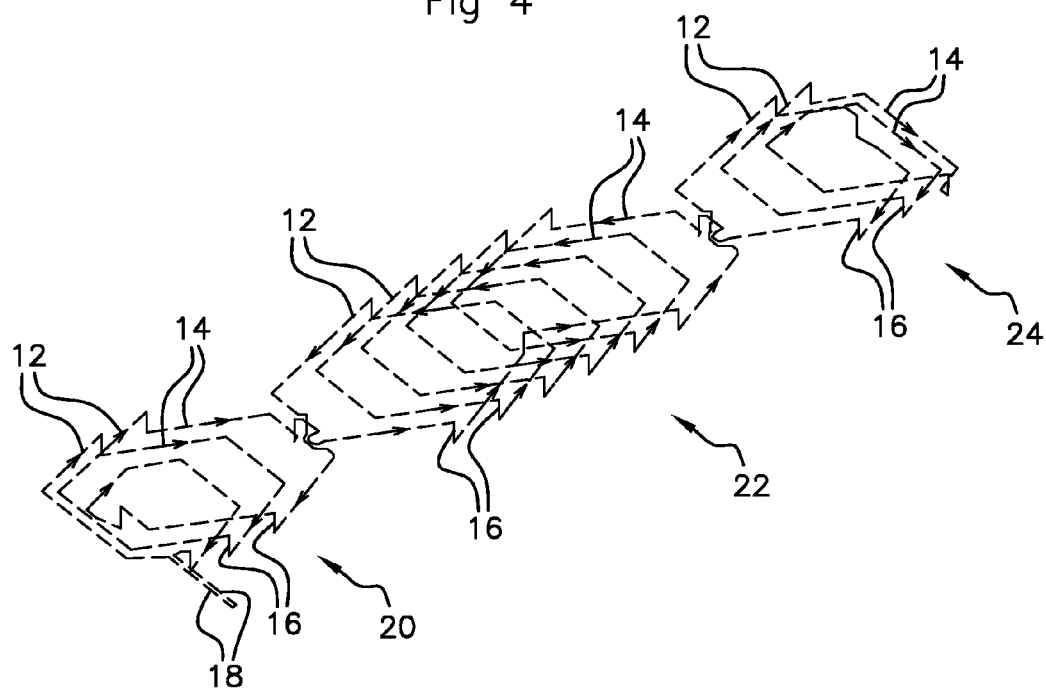
FIG. 4 is a perspective view of the secondary windings shown in FIG. 3.

In the embodiment shown in the drawing, it is proposed to superimpose on the secondary windings shown in FIGS. 1 and 2 secondary windings such as those shown in FIGS. 3 and 4. Three windings are shown in these FIGS. 3 and 4: a third secondary winding 20, a fourth secondary winding 22 and a fifth secondary winding 24.

Each of the windings shown in FIGS. 3 and 4 is produced in the same way as the first secondary winding 4 and the second secondary winding 6. Each of these windings comprises turns 8 that are offset longitudinally (along the same longitudinal axis 10, the two sets of secondary windings being intended to be superimposed by the superimposition of their longitudinal axes) each comprising a concave first upper part 12, a second lower part 14 of opposite concavity and connecting sections 16 between the upper part 12 and the lower part 14. Moreover, connecting tracks 18 are again found at the level of the set formed by the third secondary winding 20, the fourth secondary winding 22 and the fifth secondary winding 24.

The same symmetry with respect to a transverse plane as for the windings shown in FIGS. 1 and 2 does not occur for the windings shown in FIGS. 3 and 4. However, the third secondary winding 20 and the fourth secondary winding 22 are connected to each other so that for a given variable magnetic flux, the electromotive forces induced in the third secondary winding 20 oppose the electromotive forces induced in the fourth secondary winding 22. Moreover, the fourth secondary winding 22 and the fifth secondary winding 24 are connected to each other such that, for a given variable magnetic flux, the electromotive forces induced in the fourth secondary winding 22 oppose the electromotive forces induced in the fifth secondary winding 24. Within a same winding, it is observed that the electromotive forces induced by a variable magnetic flux in each of the turns 8 are added together.

Figure 5:
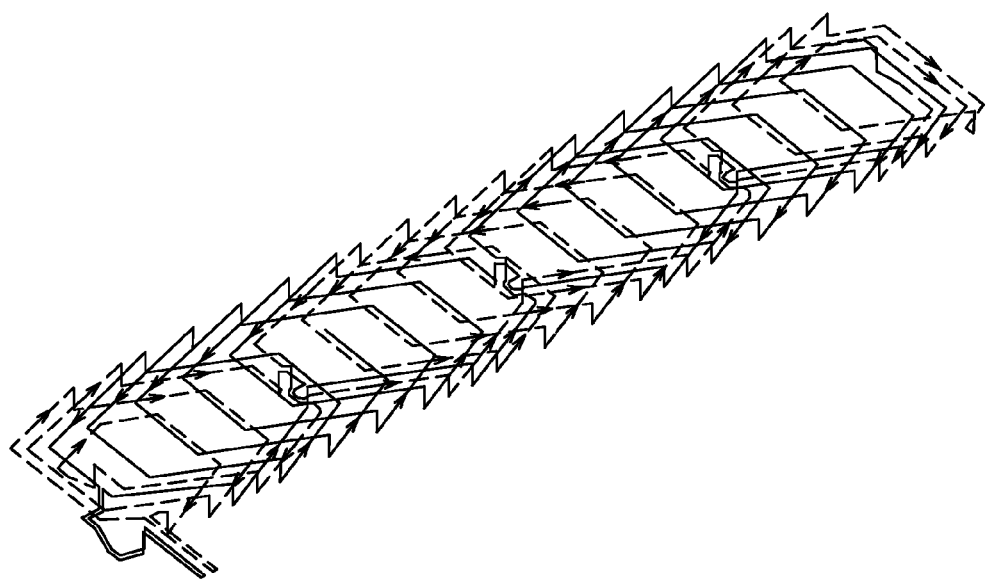
FIG. 5 is a perspective view of the assembly of the windings shown in FIG. 1 and those shown in FIG. 3.

FIG. 5 shows the superimposition, on the one hand, of the set of windings shown in FIGS. 1 and 2 and, on the other had, of the set of windings shown in FIGS. 3 and 4. The superimposition is carried out by making the longitudinal axes of the superimposed sets of windings coincide.

Figure 6:
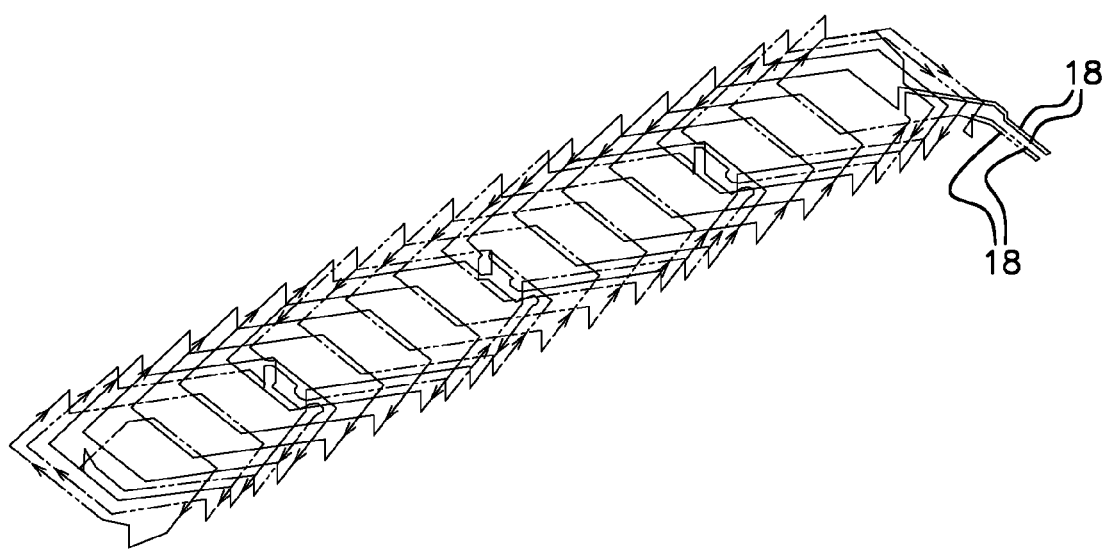
FIG. 6 is a perspective view of the redundant secondary windings similar to the windings shown in FIG. 5 except for a few details.

In a preferred embodiment, it is chosen to have redundancy in order to be able to carry out two position measurements and thus to be able to identify a possible failure of the position sensor. Redundant secondary windings are therefore provided. FIG. 6 shows a set of redundant secondary windings. This set is similar to the set shown in FIG. 5, except that in this case connection tracks 18 are provided at a different location for reasons of spatial organization of the position sensor.

FIG. 7 shows the primary winding 2. The latter comprises turns 26 that are also produced on two layers. The turns 26 each have an overall elongated rectangular shape, the size of which is adapted to surround the secondary windings.

FIGS. 8 and 9 show a preferred embodiment of a position sensor according to the present invention. This position sensor comprises the sets of secondary windings shown in FIGS. 5 and 6 as well as the primary winding 2 shown in FIG. 7.

Like the primary winding 2, the secondary windings are produced on the same printed circuit board such that the secondary windings are centered inside the primary winding 2. The latter has rectangular turns 26 disposed in such a way that, on the one hand, two opposite sides of the rectangular shape are oriented along the longitudinal direction defined by the longitudinal axis 10 of the secondary windings and, on the other hand, such that this longitudinal axis 10 is also a median axis for the primary winding 2. It is thus easily possible for each turn of a secondary winding to be located at a same distance from the primary winding 2 as another secondary winding turn. Each turn can thus contribute the same coupling, thus facilitating the adjustment of the windings to ensure good accuracy of the sensor.

The shape of the turns is preferably optimized in order to provide a larger number of turns on a given area, or more precisely in a given volume that is as small as possible. The substantially hexagonal shape of the turns allows this optimization. This is explained below.

In order to allow a "stacking" of the half-turns, that is to say of the first upper parts 12 and of the second lower parts 14, it is appropriate for these first and second parts (12, 14) to each have a flared shape. As shown in FIG. 10, for example, a first part 12 (but this is also applicable to the second part situated on the other side of the printed circuit) has a first edge 28 extending from the first via 36a, a second edge 30 extending from the second via 36b and a bottom 32 connecting the first and second edges (28, 30). The first edge 28 and the second edge 30 converge as they become more distant from the first and second vias (36a, 36b) and form an angle 34 with the longitudinal axis 10. This angle 34, in order to optimize the number of turns in a predefined space, notably depends on the width of the track of half-hexagonal shape and on the isolation distance to be complied with between two adjacent first upper parts 12 or two adjacent second lower parts 14. The dimensions of the first and second vias 36a and 36b (FIG. 10) also affect the value of the angle 34.

Preferably, still for purposes of optimization, the half-turns are regularly distributed with a regular offset.

The offset d1 (cf. FIG. 10) in the longitudinal direction between two adjacent turns, that is to say between two adjacent first vias (36a) or two adjacent second vias (36b) is less than a distance d2, measured in the longitudinal direction, between the bottom 32 of a first part 12 of a turn 8 and an axis X passing through the corresponding first and second vias (36a, 36b) (cf. FIG. 10). This makes it possible to optimize the number of turns on a given area.

In order to reduce this offset d1 (and to increase the density of turns), an edge (first edge 28 or second edge 30) can exhibit a "bulge" 38. FIG. 10 shows in its left-hand section that without a bulge in the proximity of a via 36 an edge is too close to the via, which risks giving rise to isolation problems. The bulge 38 shown on the right hand section of FIG. 10 shows that a reduced pitch can be maintained between two adjacent turns with no isolation problems.

It is considered that, despite the presence of a bulge 38 or similar, an edge of a half-turn is still straight and that the half-turn has a half-hexagonal shape.

As indicated by the preceding description, the hexagonal shape of the turns is not perfect since the hexagons are not truly closed because of the offset d1 between two adjacent turns. However, each half-turn has three sides (two edges and a bottom) forming an irregular hexagon.

The previously defined angle 34 also depends on the geometry of the sensor to be produced. If the sensor has to be relatively long in order to measure a relatively large travel, the angle 34 will be rather small. It will however remain greater than 18°.

Conversely, in order to measure a relatively short travel but without limiting the number of turns, the angle 34 will be larger, preferably without however exceeding the value of 45°.

As a non-limiting and purely illustrative example, there is for example a distance d1 between two adjacent turns which can range from 1 to several millimeters, for example from 1 to 4 mm. The number of turns for a complete secondary can for example range from 2 to 14 in order to carry out a sine function and from 3 to 15 in order to carry out a cosine function.

In the preferred embodiment of the invention, when redundant secondary windings are provided, the turns of the latter can use the same vias passing through the printed circuit board as the turns of the other secondary windings.

The present invention thus makes it possible to greatly limit the number of vias to be produced in order to form secondary windings on a printed circuit board. Even when there is no redundant circuit (corresponding to the redundant secondary windings), the number of vias is limited since only two vias per turn are necessary.

The shape of the turns proposed by the invention is easy to implement and easily adaptable. Moreover, it makes it possible to have a large number of turns in a limited volume (corresponding in fact to an area of printed circuit board).

The present invention is not limited to the embodiment described above or to the variants mentioned by way of non-limiting example. It also relates to all of the variants accessible to those skilled in the art in the context defined by the following claims.

The invention claimed is:

1. An inductive position sensor comprising:
a primary winding; and
at least two secondary windings each constituted by several turns produced on two layers of a printed circuit board, wherein
at least one of said secondary windings has turns each having substantially the same shape,
said turns are aligned along a longitudinal direction, each time with an offset along the longitudinal direction,
each of said turns has a first globally concave part disposed on one layer of the printed circuit board and a second globally concave part disposed on the other layer of the printed circuit board,
a first part of a turn is connected to a second part of the same turn by a first via passing through the printed circuit board,
the first part of the turn is connected to second part of an adjacent turn by a second via passing through the printed circuit board,
the first part of the turn has a first edge extending from the first via, a second edge extending from the second via and a bottom connecting the first and second edges,
the first edge and the second edge converge as they become more distant from the corresponding first and second vias,
an offset in the longitudinal direction between two adjacent turns is less than a distance separating a bottom of the first part of the turn and an axis passing through the corresponding first and second vias, and
the turns of a same secondary winding are connected to each other in such a way that the electromotive forces induced in these turns by an alternating magnetic field are added together.

2. The position sensor as claimed in claim 1, wherein a longitudinal offset between two turns is constant.

3. The position sensor as claimed in claim 2, wherein each first part of turn and each second part of turn substantially have the shape of a half-hexagon.

4. The position sensor as claimed in claim 2, wherein a first set constituted by first vias and a second set constituted by second vias are aligned on two segments parallel with the longitudinal direction.

5. The position sensor as claimed in claim 2, further comprising two nominal secondary windings and two redundant secondary windings, and in that the redundant secondary windings have a shape substantially similar to that of the nominal secondary windings.

6. The position sensor as claimed in claim 2, further comprising two secondary windings disposed symmetrically with respect to a median axis, and in that the electromotive forces induced in the turns of a first secondary winding oppose the electromotive forces induced in the turns of the second secondary winding.

7. The position sensor as claimed in claim 2, wherein the first edge of a first part of a turn is substantially straight and forms an angle of between 18° and 45° with the longitudinal direction.

8. The position sensor as claimed in claim 1, wherein each first part of turn and each second part of the turn substantially have a shape of a half-hexagon.

9. The position sensor as claimed in claim 8, wherein the longitudinal offset between two turns is constant.

10. The position sensor as claimed in claim 1, wherein a first set constituted by first vias and a second set constituted by second vias are aligned on two segments parallel with the longitudinal direction.

11. The position sensor as claimed in claim 1, wherein the primary winding surrounds the secondary windings and has turns comprising linear portions extending longitudinally.

12. The position sensor as claimed in claim 1, further comprising two nominal secondary windings and two redundant secondary windings, and in that redundant secondary windings have a shape substantially similar to that of the nominal secondary windings.

13. The position sensor as claimed in claim 1, further comprising two secondary windings disposed symmetrically with respect to a median axis, and electromotive forces induced in the turns of a first secondary winding oppose the electromotive forces induced in the turns of the second secondary winding.

14. The position sensor as claimed in claim 1, wherein the first edge of a first part of a turn is substantially straight and forms an angle of between 18° and 45° with the longitudinal direction.

* * * * *